United States Patent [19]

Phillips et al.

[11] Patent Number: 4,568,935

[45] Date of Patent: Feb. 4, 1986

[54] DATA REPORTING SYSTEM

[75] Inventors: Fred C. Phillips, Mount Prospect; Anil Saigal, Forest Park, both of Ill.

[73] Assignee: Honeywell Inc., Minneapolis, Minn.

[21] Appl. No.: 502,421

[22] Filed: Jun. 8, 1983

[51] Int. Cl.[4] .......................... H04Q 9/00; G08B 25/00; G08B 5/00

[52] U.S. Cl. .......................... 340/825.05; 340/505; 340/518; 340/524; 340/825.36

[58] Field of Search .............. 340/517, 522, 331, 332, 340/526, 538, 309.3, 825.36, 825.05, 505, 518, 524, 528, 500

[56] References Cited

U.S. PATENT DOCUMENTS

| | | | |
|---|---|---|---|
| 3,254,335 | 5/1966 | Staten | 340/332 |
| 3,366,834 | 1/1968 | Potter | 340/332 |
| 3,585,629 | 6/1971 | Baynard, Jr. | 340/332 |
| 3,653,025 | 3/1972 | Busch | 340/331 |
| 3,659,148 | 4/1972 | Zeman | 340/332 |
| 3,842,411 | 10/1974 | Naito | 340/332 |
| 4,356,476 | 10/1982 | Healey et al. | 340/522 |
| 4,389,632 | 6/1983 | Seidler | 340/332 |
| 4,418,334 | 11/1983 | Burnett | 340/332 |
| 4,463,352 | 7/1984 | Forbes et al. | 340/825.05 |
| 4,468,814 | 8/1984 | Field | 340/331 |

FOREIGN PATENT DOCUMENTS 2051438 1/1981 United Kingdom .

*Primary Examiner*—Donald J. Yusko
*Attorney, Agent, or Firm*—George W. Field

[57] ABSTRACT

In apparatus for communicating data by repetitively completing and opening an electric circuit, the improvement which comprises a light source inserted in the circuit to provide a visible train of light flashes upon operation of the apparatus, and circuitry for suppressing a predetermined portion of the flashes in response to a condition, to reduce the observable flashing rate of the source.

7 Claims, 6 Drawing Figures

DATA REPORTING SYSTEM

FIELD OF THE INVENTION

This invention relates to the field of data reporting systems, and particularly to such systems which include a central processor and a plurality of remote stations or data gathering panels located remotely from the processor and from each other. The invention comprises an improvement on that described in a patent application of Forbes and Winkler, Ser. No. 395,361, filed July 16, 1982, now U.S. Pat. No. 4,463,352, and assigned to the assignee of the present invention.

BACKGROUND OF THE INVENTION

In the operation of hotels, manufacturing plants, and other large building complexes, it is customary to provide status sensors such as fire alarms, intrusion detectors, and smoke detectors at sites of interest throughout the complex, and connect them all with a central unit or communications processor for monitoring, recording, or other use. One way to accomplish this is to provide a separate communication line from each sensor to the central unit. It is frequently more efficient to connect the central unit to a small number of remote stations or data gathering panels at strategic locations, as by multiconductor cables, and then extend the connections separately from the stations to individual sensors located nearby. The electric power for the sensors may efficiently be provided by common power supplies located at the remote stations rather than by separate batteries, for example. The signals from the individual sensors are thus collected at remote stations and then transmitted to the central processor.

In order to bring multiple sensor inputs to a central location economically, however, it is more desirable to use a distributed time division multiplexed bus or communication channel that is run throughout a building structure and is common to all of the plurality of widely spaced remote stations or data gathering panels which may provide inputs to the bus.

This type of reporting system is much more economical than the older types of systems which required a separate pair of wires between the central location and each of many remote stations providing inputs to the central location. The labor involved in running a separate pair of wires between each remote station and the central location, even more than the cost of the materials involved, make such "dedicated wire" systems very expensive. By providing a single common communication channel between the central location and all of the remote stations, so that all communication takes place on the same communication channel, labor and materials can both be economized.

Typically each sensor in such a system forms a part of a loop which has a normal status, an alarm status, and a trouble status. Electrically a "normal" status signal is identified by a current within a predetermined range of magnitudes, an "alarm" status signal is identified by a current magnitude greater than the predetermined range, and a "trouble" status signal is identified by a current of magnitude less than the predetermined range.

It is a characteristic of systems of this sort that, while each sensor gives its normal, trouble, or alarm status signal continuously, the signals are transmitted successively and intermittently over the communication channel to the central processor in a repeating sequence. To accomplish this the processor "polls" the remote stations sequentially over the communication channel, thereupon enabling each remote station in turn to return over the communication channel, to the central controller, signals indicative of the various sensor states at that station. It is conventional for each remote station to include means such as an addressed microcomputer, for recognizing when the communication channel is prepared to conduct the signals to the central processor, and means such as a multiplexer for supplying status signals from several sensors to the microcomputer in a repeating sequence.

It has been found that the installation, maintenance, and repair of such systems is rendered difficult due to the fact that there is no ready means whereby servicing personnel working at a particular remote station can determine whether the station is properly in communication with the central processor, or whether a sensor is supplying a normal, trouble, or alarm status signal to the remote station.

BRIEF SUMMARY OF THE INVENTION

The present invention comprises an arrangement whereby it is possible to visually observe, at a remote station, whether the central processor is in communication therewith, and whether the station is supplying a normal, trouble or alarm signal.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

DESCRIPTION OF THE PREFERRED EMBODIMENT

Figure 1:
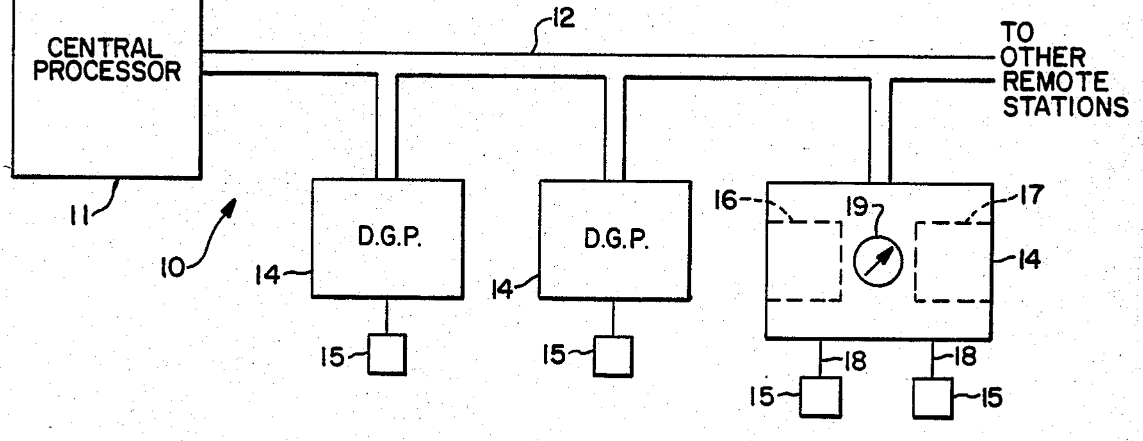
FIG. 1 is a generalized block diagram of a system according to the invention.

In FIG. 1, a data gathering system 10 according to the present invention is shown to comprise a central processor 11 connected by a communication channel 12 to remote stations or data gathering panels 14, each of which has one or more status sensors 15. Channel 12 may, if desired, be in loop form as taught in the co-pending application referred to above. As will be discussed hereinafter, processor 11 and the data gathering panels are arranged for two-way communication, so that processor 11 can "poll" the remote stations in sequence to command them to report, and the remote stations can report back the status of the various sensor loops connected to them.

Processor 11 functions to establish for each of remote stations 14 in turn a poll cycle which repeats about twelve times per second and consists of a power pulse event, a receive data event which prepares the station to communicate on channel 12, and a transmit data event during which signals are transmitted from the remote station to the central processor. As suggested in FIG. 1, each data gathering panel includes a microprocessor 16 with a unique address, a multiplexer 17 by which signals from one or more sensor lines 18 are supplied to the microcomputer individually as desired, and a visual indicator 19 by which the operation of the station may be monitored locally.

By way of explanation, the sensors 15 connected to lines 18 normally provide paths of predetermined resistance, and hence draw normal currents. If an alarm condition arises, the sensor draws a larger current in its lines 18: a trouble signal condition results if the line is interrupted or broken and the current decreases.

To obviate the need for a local power supply at each remote station, power for all stations is provided by processor 11 along channel 12. For accomplishing this, a large capacitor at each station is charged through an isolating diode during the power pulse event, to supply power during the transmit data event wherein channel 12 is short circuited in a binary code to be interpreted at the central processor.

Figure 2:
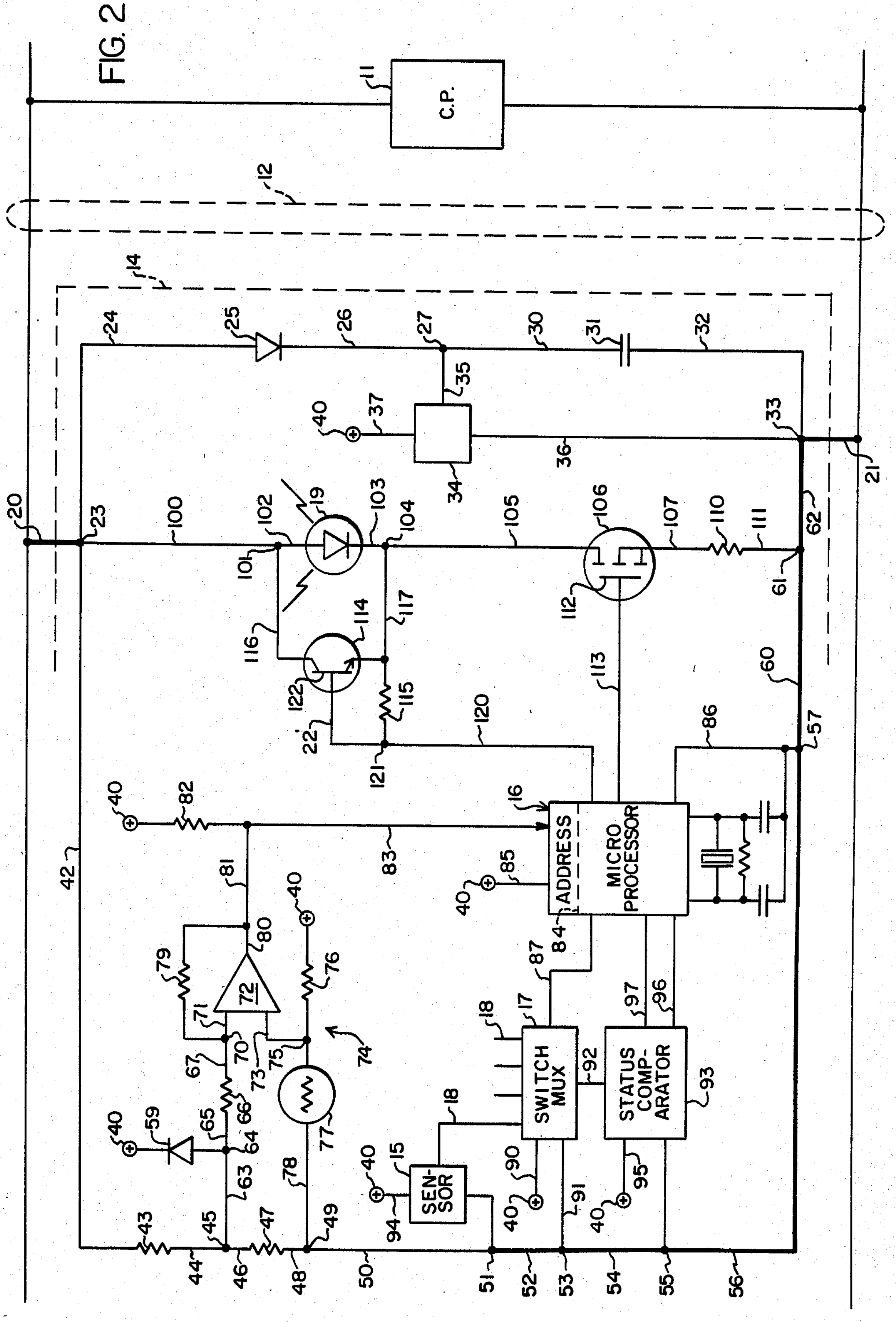
FIG. 2 shows details of a remote station or data gathering panel (D.G.P.) usable in the system of FIG. 1.

Turning now to FIG. 2, station 14 is shown to have a pair of electrical conductors 20 and 21 which are permanently connected to channel 12. When the channel comprises three conductors, the connections may be so made through a rectifier coupler, as taught in the co-pending application, that conductor 20 is always positive and that conductor 21 is always negative or ground.

A first circuit may be traced in FIG. 2 from a junction point 23 on conductor 20 through conductor 24, rectifier 25, conductor 26, junction point 27, conductor 30, a large capacitor 31, and conductor 32 to a junction point 33 on conductor 21. A voltage regulator 34 is connected to junction point 27 by conductor 35, and to junction point 33 by conductor 36: it supplies regulated voltage on conductor 37 to a terminal 40.

A second circuit may be traced in FIG. 2 from junction point 23 on conductor 20 through conductor 42, resistor 43, conductor 44, junction point 45, conductor 46, resistor 47, conductor 48, junction point 49, conductor 50, junction point 51, conductor 52, junction point 53, conductor 54, junction point 55, conductor 56, junction point 57, conductor 60, junction point 61, and conductor 62 to junction point 33 on conductor 21. A circuit may be traced from junction point 45 through conductor 63, junction point 64, conductor 65, resistor 66, conductor 67, and junction point 70 to the non-inverting input 71 of a comparator 72. A diode 59 is connected between junction point 64 and positive terminal 40 to limit voltage surges to the amplifier. The inverting input 73 of amplifier 72 is connected to a standard voltage source 74 comprising the junction point 75 between a resistor 76 connected to terminal 40 and a resistor 77 connected by conductor 78 to junction point 49. A resistor 79 is connected in feedback relation between amplifier input 71 and amplifier output 80, which is connected to terminal 40 through conductor 81 and resistor 82. The amplifier output is supplied on a conductor 83 as an input to microprocessor 16, which has means 84 usable to define an address for the microprocessor, and which is provided with power by a conductor 85 connected to terminal 40, and a conductor 86 connected to junction point 57.

Multiplexer 17 is controlled by microprocessor 16 over conductor 87, and receives power on a conductor 90 from terminal 40, the circuit being completed through conductor 91 to junction point 53. The multiplexer receives signals, from a plurality of zones or status sensors 15, on lines suggested at 18, and supplies them in sequence on a line 92 to a status comparator 93. Sensor 15 is shown as energized from terminal 40 by conductor 94, and is grounded at junction point 51, and comparator 93 is shown as energized from terminal 40 by conductor 95, and is grounded at junction point 55.

Status comparator 93 indicates normal, alarm, or trouble status to microprocessor 16, along conductors 96 and 97, in accordance with the magnitudes of the sensor signals compared to the standard signal. These signals are converted to binary bits and stored in microprocessor 16 for transmission to central processor 11.

A further circuit can be traced in FIG. 2 from junction point 23 on conductor 20 through conductor 100, junction point 101, conductor 102, visual indicator 19 comprising a light emitting diode, conductor 103, junction point 104, conductor 105, a transistor 106 such as a UN67AF field effect transistor switch, conductor 107, resistor 110, and conductor 111 to junction point 61 on conductor 21. The control electrode 112 of transistor 106 is energized from micro computer 16 on a conductor 113.

A transistor 114 having an input resistor 115 is connected between junction points 101 and 104 by conductors 116 and 117, and its control electrode 122 is energized from micro computer 16 through conductor 120, junction point 121, and conductor 22.

Figure 3:
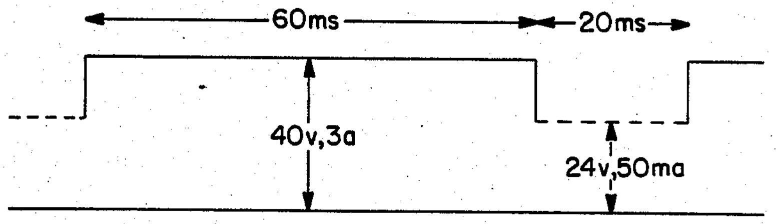
FIG. 3 illustrates the repeating poll cycle of a communication channel in the system.

FIG. 3 is illustrative of the energization of communication channel 12, which is cyclical at about 12 cycles per second. Of the 80 millisecond cycle length, 60 milliseconds comprise a power pulse, in which the central processor supplies 40 volts at 3 amperes to all the panels. During the remaining 20 milliseconds the central processor supplies 24 volts DC limited to 50 milliamps of current, so that short circuiting the channel reduces the voltage substantially to zero. By this means digital signals may be supplied as pulses on the line from and to the central processor. The first 10 milliseconds are reserved for use by the central processor in polling and commanding the panels, and the second 10 milliseconds are used for transmitting data from the panels to the central processor.

OPERATION

In general, system operation is as explained in the co-pending application referred to above, with further details as will now be outlined. Each station 14 is powered from line 12 by positive pulses, during which capacitor 31 is charged through rectifier 25: the rectifier prevents the capacitor from discharging into the line after the positive pulse is over, so that power supply 34 is continuously energized, to energize amplifier 72, sensors 15, multiplexer 17, comparator 93, and microprocessor 16.

Each of sensors 15 continuously produces a signal on its conductor 18, which is determined in magnitude by the status of the sensor. Under the control of microprocessor 16 on conductor 87, multiplexer 17 supplies the sensor signals in turn on conductor 92 to comparator 93, which in turn derives from each a normal, alarm, or trouble signal and transmits it to microprocessor 16 on conductor 96 and conductor 97, for conversion to and storage in memory as a binary number.

During the data portion of the cycle on line 12, a signal is supplied by amplifier 72 to microprocessor 16 in each remote station. If the signal agrees with the address in microcomputer 16, that unit transmits the stored binary numbers in predetermined order to control electrode 112 of transistor 106, completing the circuit between conductors 20 and 21 in a binary pattern, which short circuits line 12, and is transmitted to central processor 11, as a code interpretable at unit 11 as the status reports of the sensors 15 connected to unit 14.

Each time transistor 106 completes its circuit, current flows through indicator 19, producing a flash of light which is perceptible outside the equipment. Each signal is, in fact, a considerable number of very short flashes, determined by the binary number being transmitted, but because of the persistence of human vision, the appearance is of a single flash. If there is only one unit 14 in the system, these flashes occur at a normal rate of about 12 per second. If there are two units, the flashes at each unit occur at about 6 per second: in general, if there are n units 14 the flashes occur at 12/n per second.

The above relation continues as long as all station sensors are at normal. Personnel observing the unit will be aware of its normal rate of flashing, and the continuance of flashing at that rate indicates to such personnel first, that the unit is in communication with a central processor, and second, that all the sensors are in normal states.

Figures 4A, 4B, 4C:
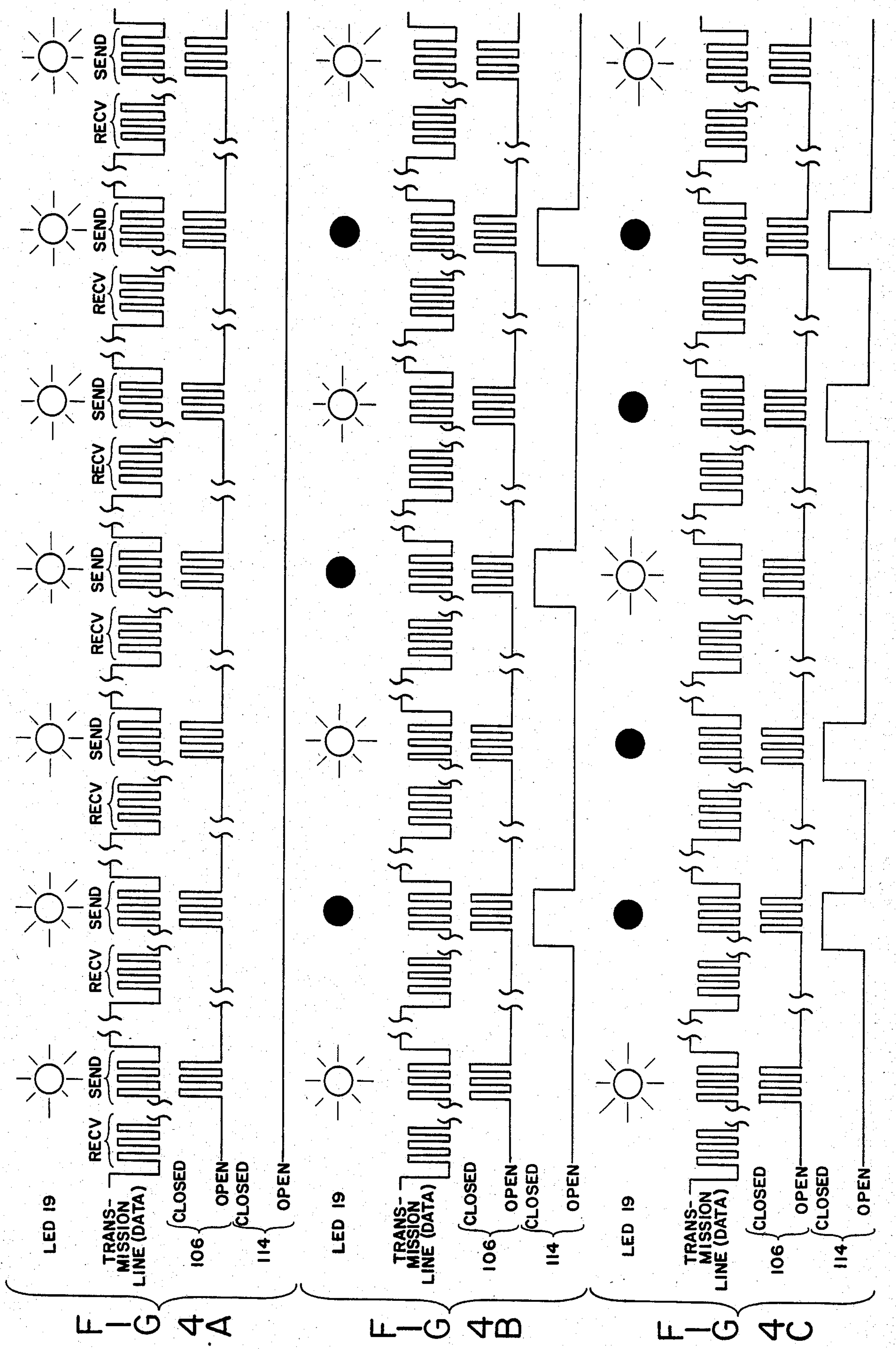
FIG. 4 schematically illustrates the operation of the system in three different status conditions.

FIGS. 4A, 4B, and 4C schematically show the operation of a system having a single remote station in normal status, trouble status, and alarm status, respectively. In each view the upper line represents the transmission line 12, in which power events alternate with data events. View A shows a normal status, in which transistor 114 is never closed, and in which transistor 106 closes in the last half of each data event to transmit a "normal" binary report to the central processor. In this status of the system, light emitting diode 19 is energized during the "send" portion of every data event.

View B shows a trouble status. Note that transistor 114 closes during the send portion of alternate data events, to shunt light emitting diode 19, so that the visible flashing rate has been cut in half.

View C shows an alarm status. Transistor 114 closes here during the send portions of two out of three data events, reducing the flashing rate to one-third of its normal value.

During the normal operation just described, microprocessor 16 supplies no signal on conductor 120, and transistor 114 does not conduct. If any one or more of sensors 15 is in trouble status, microprocessor 16 supplies a signal on conductor 120 which intermittently energizes transistor 114 to short circuit diode 19 during alternate transmission periods of transistor 106, so that the visible flash rate is one-half the normal rate, a distinction which is apparent to observing personnel. Similarly, if any one or more of sensors 14 is in an alarm status, microprocessor 16 supplies a signal on conductor 120 which intermittently energizes transistor 114 to short circuit diode 19 during two of each three successive transmission periods of transistor 106, so that the visible flashing rate is one-third of the normal rate, a distinction which is even more apparent to observing personnel. If any sensor is in an alarm state, the microprocessor produces the alarm rate or visible flashing regardless of whether some other sensor may be in trouble status, as alarm status is more significant and takes precedence.

From the above it will be evident that the invention comprises apparatus observable from outside a remote station for indicating that the station is in communication with the central processor, and for indicating whether all the status sensors connected to the unit are in normal status.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

We claim:

1. In a data gathering system, in combination:

a data gathering station including a microprocessor, a plurality of data sources, and multiplexer means connecting said sources to said microprocessor so that said microprocessor may give outputs digitally representative of said sources;

a data transmission line including a pair of conductors;

means, including switch means, for establishing a conductive path between said conductors, so that when said path is completed a pulse of current may flow between said conductors, said path including lamp means so that when current flows in said path said lamp is illuminated;

means periodically connecting said switch means to said microprocessor for actuation in accordance with the output thereof;

means energizable to prevent illumination of said lamp means without interrupting said path;

and condition responsive means for periodically energizing the last-named means.

2. A system according to claim 1 in which the periodicity of said condition responsive means is in phase with, but is a multiple of, the periodicity of actuation of said switch means.

3. A system according to claim 2 in which the periodicity is changeable dependent upon the condition sensed by said condition responsive means.

4. An alarm system for detecting normal, trouble, and alarm conditions, for displaying said conditions locally, and for transmitting at least some of said conditions remotely, said system comprising:

light emitting means;

sensor means; and, condition detection means connected to said sensor means and to said light emitting means for detecting normal, trouble, and alarm conditions of said sensor means and for energizing said light emitting means at a frequency depending upon said condition to display said conditions locally, said condition detection means having transmitter means for transmitting at least some of said conditions to a remote location.

5. Supervisory apparatus comprising an alarm device, means connected to interrogate said device repeatedly to derive successive signals from said device representative of the state each time said device is interrogated, and condition-responsive means in said device for selectively preventing individual illuminations of said lamp without disablement of said apparatus.

6. Apparatus according to claim 5 in which the condition responsive means prevents every second illumination of said lamp.

7. Apparatus according to claim 5 in which the condition responsive means prevents two out of every three successive illuminations.

* * * * *

UNITED STATES PATENT AND TRADEMARK OFFICE
CERTIFICATE OF CORRECTION

PATENT NO. : 4,568,935

DATED : February 4, 1986

INVENTOR(S) : FRED C. PHILLIPS ET AL.

It is certified that error appears in the above-identified patent and that said Letters Patent is hereby corrected as shown below:

Column 6, line 59 , after the phrase "of the state" add --thereof, a signal lamp in said device connected for illumination--.

Signed and Sealed this

Seventeenth Day of February, 1987

*Attest:*

DONALD J. QUIGG

*Attesting Officer* *Commissioner of Patents and Trademarks*